(12) United States Patent
Bart et al.

(10) Patent No.: US 7,552,591 B2
(45) Date of Patent: Jun. 30, 2009

(54) TWIN SPOOL TURBINE ENGINE WITH POWER TAKE-OFF MEANS ON THE LOW-PRESSURE AND HIGH-PRESSURE ROTORS, AND POWER TAKE-OFF MODULE FOR THE TURBINE ENGINE

(75) Inventors: Jacques Rene Bart, Verrieres le Buisson (FR); Bruno Albert Beutin, Evry (FR); Patrick Charles Georges Morel, Chartrettes (FR)

(73) Assignee: SNECMA, Paris (FR)

( * ) Notice: Subject to any disclaimer, the term of this patent is extended or adjusted under 35 U.S.C. 154(b) by 455 days.

(21) Appl. No.: 11/276,012

(22) Filed: Feb. 9, 2006

(65) Prior Publication Data

US 2006/0277920 A1 Dec. 14, 2006

(30) Foreign Application Priority Data

Feb. 11, 2005 (FR) .................................. 05 50412

(51) Int. Cl.
*F02C 7/32* (2006.01)
(52) U.S. Cl. .......................................... 60/792; 60/802
(58) Field of Classification Search .................. 60/788, 60/792, 793, 802
See application file for complete search history.

(56) References Cited

U.S. PATENT DOCUMENTS

| | | | |
|---|---|---|---|
| 4,566,269 A | 1/1986 | Gingras | |
| 4,776,163 A | 10/1988 | Brockmann | |
| 6,058,791 A | 5/2000 | Brunet | |
| 6,672,049 B2 * | 1/2004 | Franchet et al. | 60/792 |
| 7,168,913 B2 * | 1/2007 | Lardellier | 415/70 |
| 7,386,983 B2 * | 6/2008 | Miller | 60/802 |
| 2005/0100258 A1 * | 5/2005 | Brossier et al. | 384/477 |

FOREIGN PATENT DOCUMENTS

EP 1 255 023 A1 11/2002
EP 1 574 688 A1 9/2005

OTHER PUBLICATIONS

U.S. Appl. No. 11/333,506, filed Jan. 18, 2006, Beutin et al.
U.S. Appl. No. 11/276,012, filed Feb. 9, 2006, Bart et al.

* cited by examiner

*Primary Examiner*—Louis J Casaregola
(74) *Attorney, Agent, or Firm*—Oblon, Spivak, McClelland, Maier & Neustadt, P.C.

(57) ABSTRACT

The invention relates to a twin spool turbine engine comprising a high-pressure rotor and a low-pressure rotor, at least one accessory gearbox, a drive means, driving coaxial transmission shafts that transmit movement to the accessory gearbox, characterized in that the drive means comprises a high-pressure drive pinion secured to the high-pressure rotor near its upstream end, a low-pressure drive pinion secured to the low-pressure rotor upstream of the high-pressure rotor, and a power take-off module in direct mesh with the drive pinions, driving the transmission shafts.

By virtue of the invention, the transmission shafts run coaxial with one another and therefore pass through a single arm. The use of a power take-off module simplifies the mechanism. The turbine engine is simpler to assemble.

11 Claims, 1 Drawing Sheet

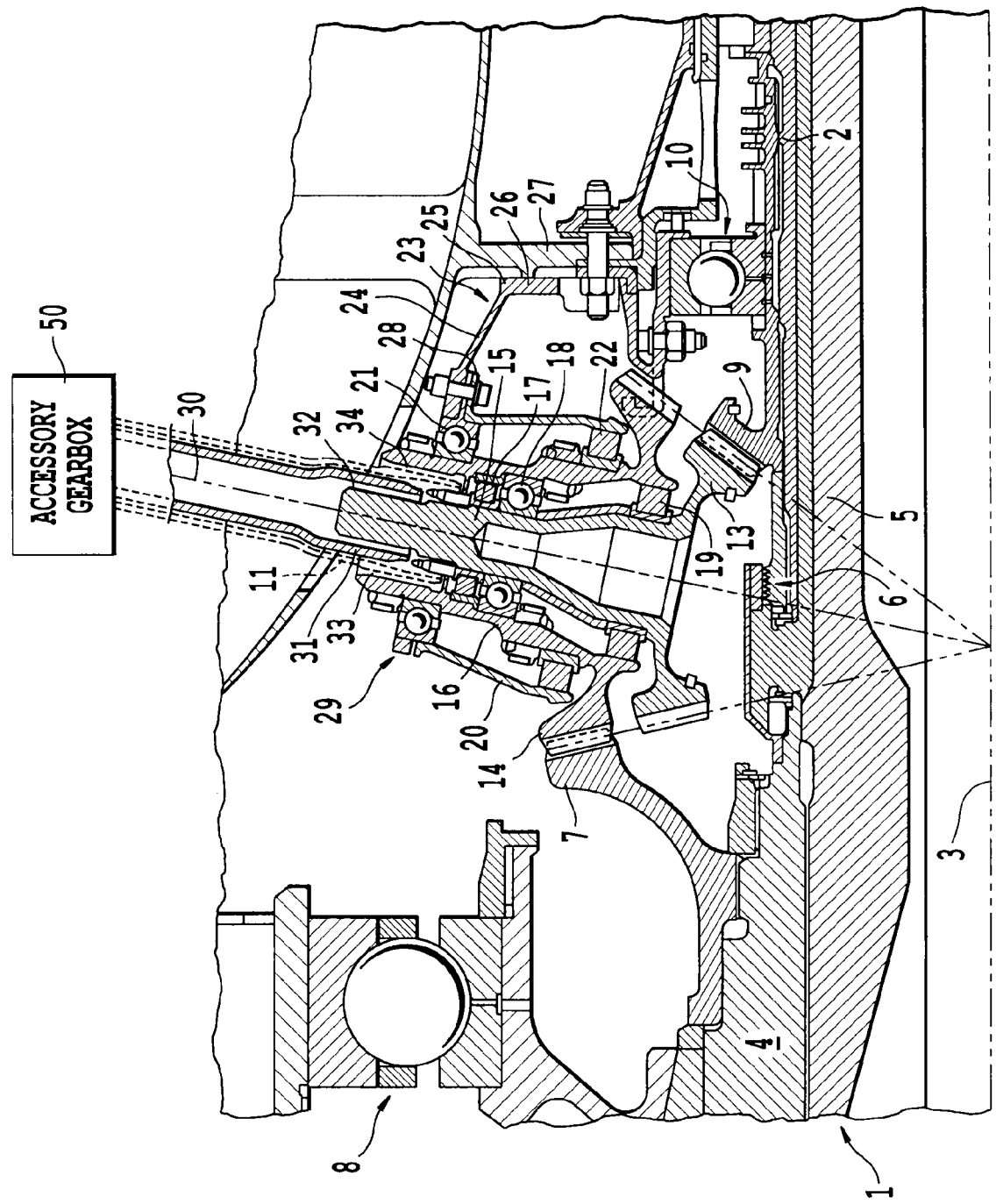

TWIN SPOOL TURBINE ENGINE WITH POWER TAKE-OFF MEANS ON THE LOW-PRESSURE AND HIGH-PRESSURE ROTORS, AND POWER TAKE-OFF MODULE FOR THE TURBINE ENGINE

BACKGROUND OF THE INVENTION

1. Field of the Invention

The invention relates to a twin spool turbine engine with power take-off means on the low-pressure and high-pressure rotors, to a power take-off module for the turbine engine and to a method for assembling the turbine engine.

2. Discussion of Background

Some of the power generated by an aeronautical turbine engine is used to power various components, both of the turbine engine and also of the aircraft to the propulsion of which the turbine engine contributes.

Some of this power is actually tapped off the high-pressure (HP) compressor, the compressed air of which is used in particular to pressurize and air-condition the cabin of the aircraft, or for de-icing purposes. Some more of this power is tapped mechanically off the shaft of the HP stage of the turbine engine, to drive the input shaft of an accessory gearbox positioned on a casing of the turbine engine. This input shaft is rotationally driven by a transmission shaft running along a structural arm of the casing and itself driven by a pinion secured to the HP shaft.

The accessory gearbox, well known to those skilled in the art by the abbreviation AGB, comprises various machines or accessories, for example a generator, a starter, an alternator, hydraulic fuel or oil pumps, etc. These various accessories are mechanically driven by the HP shaft.

The current trend is to increase, on the one hand, the tapping of mechanical power because of the increasing role played by electrical means which are reputed to be more flexible in their use.

However, tapping off excessive amounts of mechanical power has a negative effect on the operation of the HP spool because it is liable to cause compressor surge, particularly when the engine is running at low speed.

The teachings of the prior art are to tap some of the mechanical power from the low-pressure (LP) spool. Various solutions have been imagined. Document FR 2 606 077 proposes to connect the rotors of the turbine engine directly to the two inputs of a differential positioned near them. Such an arrangement is not, however, always possible because of the space that this arrangement requires within the heart of the turbine engine. Document GB 973 388 describes, for an industrial turbine, driving the accessory gearbox, situated on the exterior casing of the turbine, using power take-offs from the HP shaft and the LP shaft: however, the power take-offs from each of the shafts are connected to the accessory gearbox by bulky gear sets. Such cannot be done in a modern turbine engine in which these gear sets have to pass through the structural arms of the casing.

The applicant company has filed the French Patent Application No. FR 03 14 429 regarding a twin spool turbine engine, the accessory gearbox of which is driven by the LP and HP shafts, which are connected to transmission shafts, each passing through one structural arm and which are connected to the two inputs of a differential connected at output to the drive shaft of the accessory gearbox. While such a solution is advantageous in numerous respects, it is, however, sometimes necessary not to clutter two structural arms, this being so as to leave the greatest possible amount of space for running the auxiliaries through. The auxiliaries are fluid-carrying pipework or trunking for electrical cables carrying power or information (speed sensors for example).

Document U.S. Pat. No 4,776,163 describes a jet engine in which the HP and LP shafts can alternately drive the accessory gearbox, to which they are connected by coaxial transmission shafts. Because they are coaxial, these shafts can run along a common structural arm. However, as can be seen from the FIGURE in that document, the power take-off from the rotors at the end of the shafts is very bulky and requires a significant amount of space over a broad region of the shafts.

SUMMARY OF THE INVENTION

Modern turbine engines do not have such amounts of space for the power take-off from the rotors at the ends of the transmission shafts. Furthermore, present-day turbine engines are designed for a power take-off from the HP rotor only and it would be desirable to propose a power take-off and transmission device for the LP and HP rotors which could be installed without significant changes to the structure of the turbine engine. It is also necessary, in the case of the pinions secured to the rotors from which the power is taken off, to comply with maximum diameters, defined on the basis of the maximum pinion peripheral speed that is acceptable in order for gears to mesh with a defined amount of slip. For example, the maximum permissible speed at the periphery of the power take-off pinion taking power from the rotor may be of the order of 160 to 170 m/sec. It is also desirable to install a power take-off and transmission device that is of small size and weight.

Hence, the invention relates to a twin spool turbine engine comprising a high-pressure rotor and a low-pressure rotor, at least one accessory gearbox, a drive means, driving coaxial transmission shafts that transmit movement to the accessory gearbox, characterized in that the drive means comprises a high-pressure drive pinion secured to the high-pressure rotor near its upstream end, a low-pressure drive pinion secured to the low-pressure rotor upstream of the high-pressure rotor, and a power take-off module in direct mesh with the drive pinions, driving the transmission shafts.

By virtue of the invention, the transmission shafts run coaxial to one another and therefore pass through a single arm. The use of a power take-off module simplifies the mechanism, which can easily be installed on a jet engine designed in advance for a power take-off from the HP shaft, simply by adding a pinion to the LP shaft, the power take-off module and the coaxial power take-off shafts. A module is also, by definition, ready assembled before being installed, thus assembled, on the turbine engine, thus making the latter easier to assemble.

The invention also relates to a power take-off module for a turbine engine as set out hereinabove comprising a box and two power take-off pinions secured to end pieces contained in the box.

The invention also relates to a method for assembling a turbine engine as set out hereinabove, comprising the steps consisting in:
  mounting the high-pressure rotor;
  mounting the power take-off module;
  fitting the transmission shafts into the power take-off module, and
  mounting the low-pressure rotor.

BRIEF DESCRIPTION OF THE DRAWINGS

The invention will be better understood with the aid of the following description of its preferred embodiment, with reference to the single attached FIGURE which depicts a schematic sectional view of the power take-off region of the turbine engine of the invention.

DETAILED DESCRIPTION OF THE PREFERRED EMBODIMENTS

The turbine engine of the invention is a twin spool turbine engine comprising a low-pressure (LP) rotor 1 and a high-pressure (HP) rotor 2, which are mounted to rotate about the axis 3 of the turbine engine. This type of turbine engine is well known to those skilled in the art. It may be a jet engine or a turboprop engine, for example. In fact it is any turbine engine comprising a compressor and a turbine, of the twin spool type, having a low-pressure spool and a high-pressure spool. Internal and external or inside and outside is to be understood in the description to be internal or external, or inside or outside pertaining to the turbine engine, in the radial direction, with respect to its axis 3.

More specifically, the turbine engine functionally comprises, from the upstream to the downstream end in the direction in which the gases flow, a fan, a compressor, a combustion engine, a turbine and a jet pipe. As it is a twin spool engine it comprises an LP compressor upstream of an HP compressor and an HP turbine upstream of an LP turbine. The rotor of the fan is secured to the shaft 4 of the LP compressor, itself secured to the shaft 5 of the LP turbine. The LP rotor 1 therefore comprises these three elements secured together. The shaft 5 of the LP turbine runs coaxially inside the HP rotor 2, which is the shaft of the HP compressor and of the HP turbine, secured together. The downstream end of the shaft 4 of the LP compressor, secured to the shaft 5 of the LP turbine, lies just upstream of the upstream end of the HP rotor 2. The shaft 4 of the LP compressor is fixed coaxially to the outside of the shaft 5 of the LP turbine. There is a seal 6 between the downstream end of the shaft 4 of the LP compressor and the upstream end of the HP rotor 2, to provide sealing between the region on the outside, bathed in a mist of lubricating oil, and the region on the inside, in which chiefly air circulates.

The shaft 4 of the LP compressor comprises, near its downstream end, a drive pinion 7 that will be termed the LP drive pinion 7. This LP drive pinion 7 is situated downstream of the downstream bearing 8 of the LP compressor shaft 4. The HP rotor 2 comprises, near its upstream end, a drive pinion 9 which will be termed the HP drive pinion 9. This HP drive pinion 9 is situated upstream of the upstream bearing 10 of the HP rotor 2. The diameter of the LP drive pinion 7 is greater than the diameter of the HP drive pinion 9.

The turbine engine comprises a transmission shaft 11 that transmits the movement of the LP shaft, and that will be termed the LP transmission shaft 11, and a transmission shaft 12 that transmits the movement of the HP shaft, that will be termed the HP transmission shaft 12.

The LP transmission shaft 11 and HP transmission shaft 12 are rotationally driven by a power take-off module 29 from the LP drive pinion 7 and the HP drive pinion 9.

The HP transmission shaft 12 is connected and secured, at its internal end, to a power take-off pinion 13 of the power take-off module 29, that will be termed the HP power take-off pinion 13, designed to mesh with the HP drive pinion 9. The LP transmission shaft 11 is connected and secured, at its internal end, to a power take-off pinion 14 of the power take-off module 29, that will be termed the LP power take-off pinion 14, designed to mesh with the LP drive pinion 7. The LP power take-off pinion 14 is coaxial with the HP power take-off pinion 13, of a greater diameter than the latter and situated on the outside with respect to it.

Each of the power take-off pinions, the HP one 13 and the LP one 14, is secured to a respective end piece 15, 16 of the power take-off module 29, which end piece is connected to the corresponding HP shaft 12 or LP shaft 11 to which it is secured. Each end piece 15, 16 comprises, from the outside inwards, a cylindrical portion and a frustoconical portion, the diameter of which increases toward the inside. The corresponding HP or LP power take-off pinion 13 or 14 respectively lies at the internal end of the frustoconical portion and here is formed of one piece with the end piece 15, 16 supporting it.

Mounted between the end pieces 15, 16 is a set of bearings allowing these pieces 15, 16 and therefore the transmission shafts 12, 11 to rotate with respect to one another, either in a co-rotary or in a contrarotary fashion, depending on how the HP rotor 2 and LP rotor 1 are designed to rotate. This set of bearings here comprises, from the outside inwards, a first roller bearing 17, a ball bearing 18, which also plays a part in axially positioning the end pieces 15, 16 one relative to the other, and a second roller bearing 19, placed at the internal end of the end piece 16 of the LP transmission shaft 11.

The external portion of the end pieces 15, 16, namely that portion of these pieces that lies on the outside relative to the power take-off pinions 13, 14 is enveloped and held in a box 20 of the power take-off module 29 of the turbine engine, that will be named the box 20. This box 20 is of tubular shape and runs coaxial to the end pieces 15, 16 and therefore to the HP and LP transmission shafts 12 and 11 respectively; more specifically, it is of frustoconical overall shape, its diameter increasing towards the inside so as to match the shape of the end pieces 15, 16. Between the end piece 16 of the LP transmission shaft 11 and the box 20 there are two bearings, a ball bearing 21 situated towards the external end of the box 20 and also acting to axially position the end piece 16 with respect to the box 20, and a roller bearing 22 situated towards the inside end of the box 20.

The box 20 is fixed to the fixed structure of the turbine engine by a flange portion 23 exhibiting an upstream portion 24 hugging the upstream external shape of the box 20, extending in the downstream direction and exhibiting an elbow 25 from which it exhibits a portion 26 running transversely to the axis 3 of the turbine engine, which portion 26 is fixed in this instance using screws, to a flange 27 of the fixed structure of the turbine engine. The upstream portion 24 is fixed to a flange 28 projecting from the box 20, on its downstream side, here using screws.

Thus, the LP and HP transmission shafts 11 and 12 respectively are kept, via the box 20, secured to the fixed structure of the jet engine, the end pieces 16, 15 of the power take-off module also being protected. They are free to rotate about their axis.

The way in which the power take-off module 29 of the invention is assembled and works will now be explained in greater detail. The power take-off module 29 comprises the HP and LP power take-off pinions 13 and 14 respectively, the corresponding end pieces 15, 16 and the box 20, together with the corresponding bearings 17, 18, 19, 21, 22.

It will be immediately noted that the overall structure of a turbine engine, which was designed to take a power take-off device on the HP shaft in a longitudinal location similar to that of the invention, is little changed by the fitting of the means for driving the transmission shafts 11, 12 of the invention, inasmuch as all that is required is the addition of a drive pinion 7 on the LP rotor 1, the power take-off module 29 and the two coaxial transmission shafts 11, 12. Since the assembly is compact, its bulk is limited. The means for driving the transmission shafts 11, 12 is the LP and HP drive pinions 7 and 9 respectively of the shaft 4 of the LP compressor and the shaft 5 of the LP turbine, and the power take-off module 29.

When assembling the turbine engine, the HP rotor 2 is first of all mounted. The box 20 of the power take-off module 29 is then mounted, which already contains the end pieces 15, 16 of the transmission shafts 12, 11 and all the required bearings 17, 18, 19, 21, 22, which end pieces 15, 16 are not at this stage of assembly secured to their respective shafts 12, 11. In other words, the power take-off module 29 has been preassembled and is mounted directly "as a unit" on the turbine engine. The box 20 is fixed to the flange 27 of the fixed structure of the turbine engine. During the mounting of the module 29, the HP power take-off pinion 13 of the end piece 15 of the HP transmission shaft 12 will mesh with the HP drive pinion 9 of the HP rotor 2.

The transmission shafts 11, 12 are then fitted into the structural arm of the turbine engine through which they are intended to run. In the particular instance considered here, the turbine engine is a jet engine and the transmission shaft 11, 12 run along one arm of what is known as the intermediate casing, well known to those skilled in the art, which is a structural casing forming part of the fixed structure of the jet engine, the external jacket of which lies in the continuation of the fan casing, and to which are generally connected the pylons for securing the engine to the aircraft in the propulsion of which the jet engine is intended to contribute. When they have been fitted, the transmission shafts 11, 12 come into mesh with their corresponding end piece 16, 15 which in this way becomes secured to it, at least in terms of rotation. In the particular case considered here, the external portion of the end piece 15 of the HP transmission shaft 12 comprises a spline 31, at its external periphery, with which there meshes a spline 32 on the internal end of the HP transmission shaft 12, which runs from the internal portion of this tubular internal end portion. These two elements thus rotate as one. Similarly, the external portion of the end piece 16 of the LP transmission shaft 11, which is tubular, has a spline 33, extending from its internal periphery, and with which there meshes a spline 34 on the internal end of the HP transmission shaft 12, which extends from the external portion of this tubular internal end portion. These two elements thus rotate as one.

The LP rotor 1 is then fitted into the turbine engine. In doing this, the LP drive pinion 7 of the shaft 4 of the LP compressor will mesh with the LP power take-off pinion 14 of the end piece 16 of the LP transmission shaft 11.

The power take-off module 29, the LP rotor 1 and the HP rotor 2 and the LP and HP transmission shafts 11 and 12 respectively are thus mounted with respect to one another, the means of driving the transmission shafts 11, 12 being correctly positioned.

As the turbine engine operates, the LP rotor 1 and the HP rotor 2 rotate, in the same direction or in different directions depending on how the turbine engine is designed. Their LP and HP drive pinions 7 and 9 respectively rotationally drive the LP and HP power take-off pinions 14 and 13 respectively of the power take-off module 29, and these rotationally drive the BP transmission shaft 11 and HP transmission shaft 12 via the end pieces 16, 15 and the splines (31, 32), (33, 34). At their external ends the transmission shafts 11, 12 are connected to one or more accessory gearboxes. Thus, each transmission shaft 11, 12 can drive a different accessory gearbox or alternatively the shafts 11, 12 are coupled in such a way as to drive the same accessory gearbox. For this, the shafts 11, 12 may, for example, drive the inputs of a differential gear, the output of which is connected to the drive shaft of the accessory gearbox, in a way well known to those skilled in the art.

It may be noted that, in the embodiment of the FIGURE, the axis 30 of the transmission shafts 11, 12 is not at right angles to the axis 3 of the turbine engine. The drive pinions 7, 9 of the rotors 1, 2 and the power take-off pinions 14, 13 of the power take-off module 29 are structurally arranged accordingly. Depending on the chosen embodiment, these pinions may be straight-cut, bevel or some other type of pinions, designed by the person skilled in the art to ensure a correct power take-off. The angle formed here by the axis 30 of the transmission shafts 11, 12 is dictated by the fact that these are shafts 11, 12 passed through a structural arm which is not entirely plumb with the region in which the power is taken off which, once again, corresponds to the region in which the upstream end of the HP rotor 2 and the downstream end of the shaft 4 of the LP compressor are situated.

By virtue of the invention, the two transmission shafts 11, 12 are coaxial, which means that they can be passed through one single arm of the turbine engine. Furthermore, the power take-off module 29 is very simple to mount, the LP and HP transmission shafts 11 and 12 respectively simply being pushed into their respective end piece 16, 15 so as to be rotationally driven by the LP rotor 1 and the HP rotor 2. The diameter of the HP drive pinion 9 of the HP rotor 2 is the smaller one so as to meet the permissible peripheral speed limit for the teeth of the pinions so that movement can be transmitted with the minimum of slippage. The larger diameter of the LP drive pinion 7 is permissible because the LP rotor 1 rotates at a lower speed. The compactness of the power take-off module 29 and of the drive means in general leads to minimized bulk and mass.

The invention claimed is:

1. A twin spool turbine engine comprising:
   a high-pressure rotor,
   a low-pressure rotor,
   at least one accessory gearbox,
   drive means for driving coaxial transmission shafts that transmit movement to the accessory gearbox, wherein the drive means comprises a high-pressure drive pinion secured to the high-pressure rotor near its upstream end, a low-pressure drive pinion secured to the low-pressure rotor upstream of the high-pressure rotor, and
   a power take-off module in direct mesh with the drive pinions, driving the transmission shafts, wherein said power take-off module comprises a cylindrical portion secured to said coaxial transmission shafts and a frustroconical portion extending internally from said cylindrical portion, said power take-off module further comprising a high pressure take-off pinion secured to said frustroconical portion and in direct mesh with said high-pressure drive pinion, and a low pressure take-off pinion secured to said frustroconical portion and in direct mesh with said low-pressure drive pinion.

2. A turbine engine according to claim 1, wherein the transmission shafts are fitted into the power take-off module.

3. A turbine engine according to claim 1, wherein said low-pressure power take-off pinion is coaxial with the high-pressure power take-off pinion.

4. A turbine engine according to claim 1, wherein the turbine engine includes a fixed structure and the power take-off pinions are secured to end pieces, the power take-off module and said end pieces are contained in a box secured to the fixed structure of the turbine engine.

5. A turbine engine according to claim 4, wherein the transmission shafts are in mesh with the end pieces via splines.

6. A turbine engine according to claim 1, wherein the diameter of the high-pressure drive pinion is smaller than the diameter of the low-pressure drive pinion.

7. A turbine engine according to claim 1, wherein the high-pressure drive pinion is situated upstream of the upstream bearing of the high-pressure rotor and the low-pressure drive pinion is situated downstream of the downstream bearing of the low-pressure compressor shaft of the low-pressure rotor.

8. A turbine engine according to claim 1 which is a jet engine, in which the transmission shafts run along one structural arm of the intermediate casing.

9. A turbine engine according to claim 1, further comprising a box having a frustroconical shape and containing said frustroconical portion of said power take-off module, said box being secured to a fixed structure for said turbine engine.

10. A turbine engine according to claim 1, wherein said coaxial transmission shafts are not at right angles with respect to an axis of said turbine engine, said high-pressure and low-pressure rotors being configured to rotate around said axis.

11. A twin spool turbine engine comprising:

a high-pressure rotor, a low-pressure rotor, at least one accessory gearbox, a drive means for driving coaxial transmission shafts that transmit movement to the accessory gearbox, wherein the drive means comprises a high-pressure drive pinion secured to the high-pressure rotor near its upstream end, a low-pressure drive pinion secured to the low-pressure rotor upstream of the high-pressure rotor, and a power take-off module in direct mesh with the drive pinions, driving the transmission shafts, wherein said power take-off module is a preassembled module mounted on said turbine engine as a unit comprising a high pressure take-off pinion configured to be in direct mesh with said high-pressure drive pinion, and a low pressure take-off pinion configured to be in direct mesh with said low-pressure drive pinion.

* * * * *